United States Patent [19]
Mott, deceased et al.

[11] 3,698,168
[45] Oct. 17, 1972

[54] BLADE CONNECTING MEANS

[72] Inventors: Carl W. Mott, deceased, late of Lake Ozark, Mo. by Elsie Viola Mott, executrix; Carl Wheeler Mott, Jr., La Grange Park, Ill.; Elnora Mott Hart, Rock Falls, Ill.; Dorothy Mott Battles, De Kalb, Ill.; Phyllis Mott Halgren; Elmer Samuel Mott, both of Downers Grove, Ill. heirs

[73] Assignee: Mott Corporation, La Grange, Ill.

[22] Filed: July 6, 1971

[21] Appl. No.: 160,010

[52] U.S. Cl. .................................................. 56/294
[51] Int. Cl. ............................................. A01d 55/22
[58] Field of Search .......... 56/294, 295, 289, 12.7, 29

[56] References Cited

UNITED STATES PATENTS

| 2,711,067 | 6/1955 | Mott | 56/289 |
|---|---|---|---|
| 2,740,249 | 4/1956 | Stearns | 56/295 |
| 3,190,064 | 6/1965 | Wenzel et al. | 56/294 |
| 3,395,522 | 8/1968 | Zweegers | 56/295 |
| 3,400,527 | 9/1968 | Woodring | 56/294 |
| 3,505,800 | 4/1970 | McCanse | 56/294 |
| 3,507,104 | 4/1970 | Kline et al. | 56/295 |
| 3,527,038 | 9/1970 | Wood et al. | 56/294 |
| 3,604,188 | 9/1971 | Mott | 56/294 |
| 3,604,189 | 9/1971 | Harer et al. | 56/295 |

FOREIGN PATENTS OR APPLICATIONS

| 846,853 | 8/1960 | Great Britain | 56/12.7 |

Primary Examiner—Russell R. Kinsey
Attorney—George N. Hibben et al.

[57] ABSTRACT

Blade connecting means comprises a lug member and a retaining member. The lug member and retaining member are adapted to be secured to a mower shaft and to removably secure a mower blade to the mower shaft. The lug member has at least on one end a hook on which the blade is hung, and the retaining member normally engages and closes the hook of the lug member to retain the blade on the hook and, hence, on the shaft. The blade may be easily installed on or removed from the shaft by manipulating the blade to move the retaining member to a position where the hook is open, no tools being necessary to install or remove the blade.

14 Claims, 5 Drawing Figures

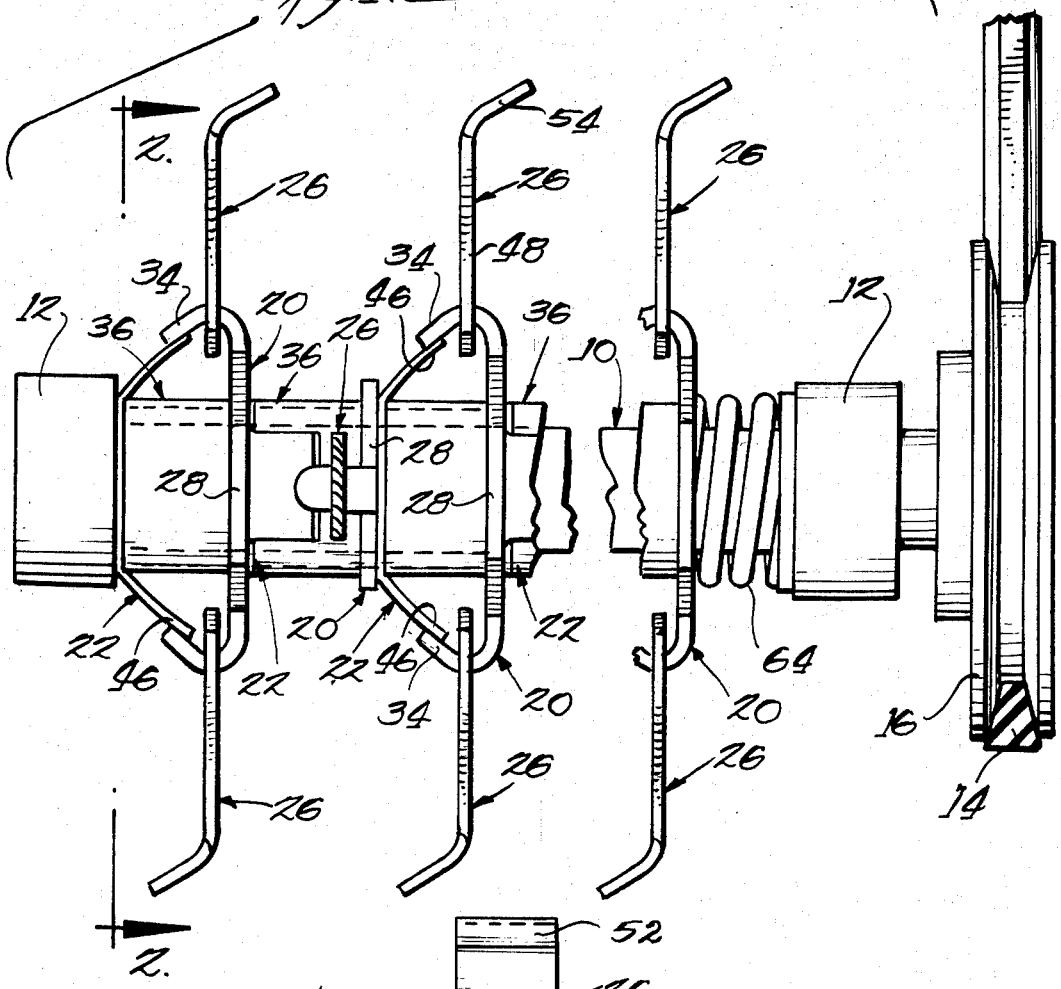
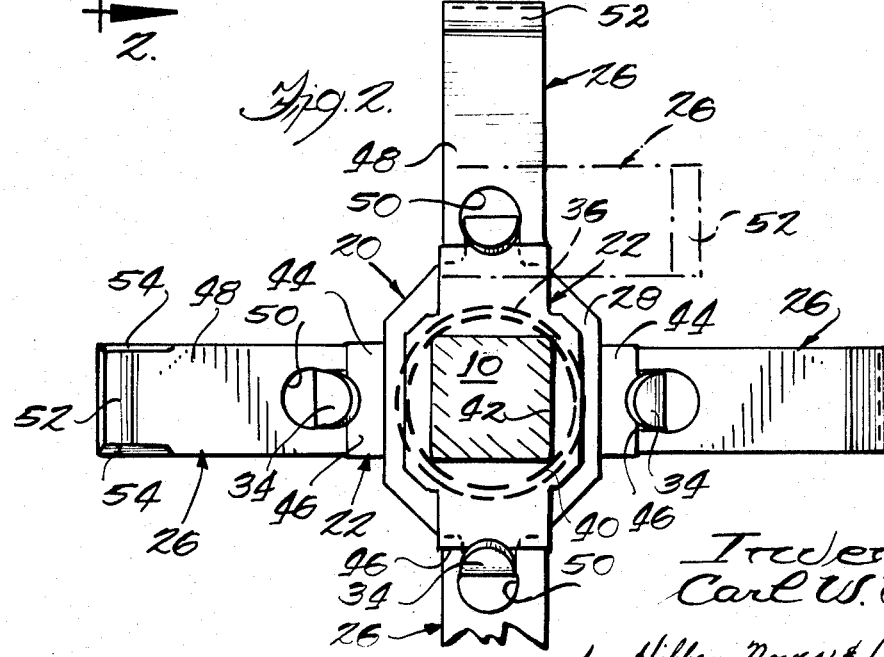

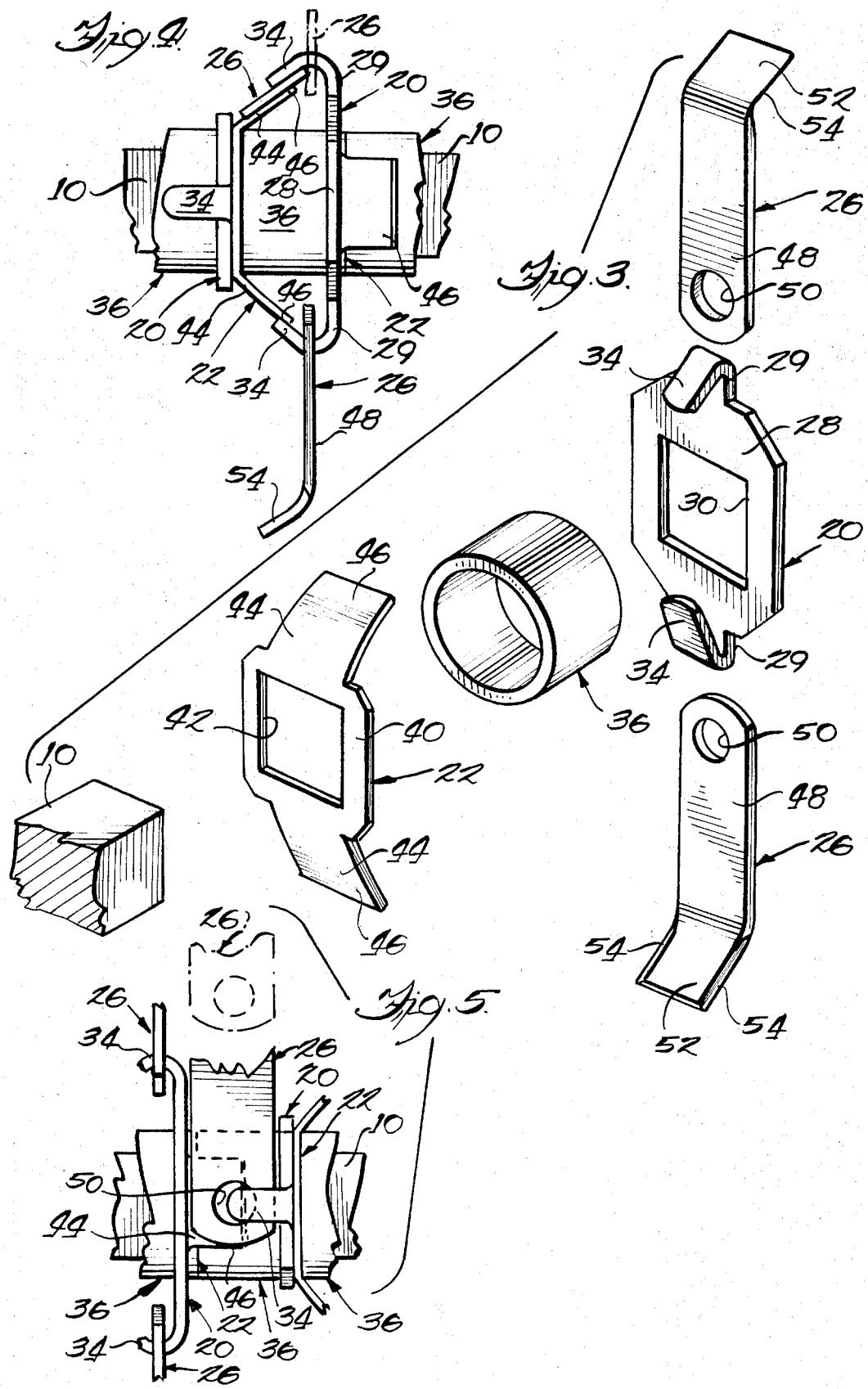

BLADE CONNECTING MEANS

This invention relates to a means for connecting a blade to a mower shaft, and more particularly to a blade connecting means which permits a blade to be connected manually to the shaft without using a tool.

Heretofore, various blade connections to attach blades to a mower shaft have been developed, such as is shown in my copending U.S. patent application Ser. No. 75,347, filed Sept. 25, 1970. These connections, while satisfactory, have required the use of a tool or pliers in order to install the blades on or remove the blades from the mower shaft. At times a tool is not available for such task, and repair of a damaged mower is unnecessarily delayed until the required tool can be obtained.

The blade connecting means of the present invention permits a blade to be easily, manually installed or removed without the use of a tool, simply by manipulating the blade. The blade connecting means securely retains the blade on the shaft, and comprises a lug member adapted to be secured to the mower shaft and a retaining member adapted to be secured either to the mower shaft or to the lug member. The lug member has a hook which is adapted to be engaged in an opening in the blade. One of said members is resilient, and the retaining member has a free end which closes the hook to retain the blade in position.

The blade is removed from the lug member simply by pivoting the blade on the retaining member, thereby separating the retaining member and the lug member so that the blade may be slid through the gap therebetween. The blade is installed or hung on the lug member by sliding the blade between the lug member and retaining member and reversing the above-mentioned operations.

Accordingly, it is a primary object of the present invention to provide a blade connecting means on which a blade may be installed or removed manually without the use of a tool.

Another object of the invention is to provide a blade connecting means of the foregoing character on which a blade is held on a lug member by a retaining member.

These and other objects of the present invention will become apparent from the following description and accompanying figures of the drawings in which:

FIG. 1 is a broken, front elevational view of a mower shaft having a plurality of blade connections embodying the features of the present invention;

FIG. 2 is a sectional view taken along the line 2—2 of FIG. 1;

FIG. 3 is a fragmentary, exploded perspective view of one of the blade connections;

FIG. 4 is a front elevational view of a blade connection showing one blade being removed therefrom; and FIG. 5 is a plan view of the blade connection and blade shown in FIG. 4.

FIG. 1 illustrates a mower shaft, indicated at 10, having blade connecting means of the present invention. The end portions of the shaft 10 are rotatably mounted in bearings 12 which are in turn supported in a mower housing (not shown). The shaft 10 may be rotated by means of a belt 14 which drives a pulley 16 mounted on one end of the shaft 10.

Along the shaft 10, at spaced intervals, are a plurality of blade connecting means for securing a plurality of blades to the shaft. Each blade connecting means comprises a lug member 20 and an associated retaining member 22 for securing to the shaft a blade 26 having an opening therein. While the lug members might be permanently secured to the shaft, in this instance they are removably secured to the shaft 10. Each lug member 20 has a center portion 28 adapted to be secured to the shaft 10 and at least one outer end portion 29 on which the blade may be carried. Preferably, each lug member 20 is formed from sheet metal with an opening 30 in its center portion 28. The opening 30 corresponds in shape to the cross section of the shaft 10 which, in this instance, is square. The end portions 29 extend radially and oppositely from the center portion 28, and are bent to one side of the lug member and then inwardly to form hooks 34. The bends of the hooks 34 are located at the outer ends of the lug members 20. The use of two opposed hooks 34 on each lug member permits the two blades 26 to balance each other. The hooks 34 are located at sufficient distance from the shaft 10 for the blades 26 to be manipulated for installation or removal, as hereinafter described. The end portions 29 are substantially narrower than the center portions 28.

While the retaining members might be secured to the lug members or might be permanently secured to the shaft, in this instance they are removably secured to the shaft 10. Each retaining member 22 cooperates with an associated lug member 20 and is held in spaced relation therefrom by a spacer 36. Preferably, the retaining members 22 are made of a resilient material, such as spring steel, and each has a center portion 40 with a non-circular opening 42 therein for mounting on the shaft. Both the center portion 40 and the opening 42 are similar to the corresponding portion 28 and opening 30 of the lug member 20. Elongated tabs 44 extend from two opposite ends of the center portion 40, and the tabs 44 are bent toward one side of the retaining member so as to extend angularly away from the center portion 40 toward the hooks 34 in generally parallel relation to the end portions of the hooks 34. The free ends, indicated at 46, of the tabs 44 underlie and engage the inner surfaces of the hooks 34 of the lug members 20. Thus, the free ends close the openings of the hooks 34 and retain the blades 26 on the lug members 20, as shown in FIG. 4.

While many types of blades having an opening therein would be suitable for use with the blade connecting means of the present invention, preferably the blade 26, shown in FIG. 3, is used. The blade 26 comprises a strip of sheet metal having an inner portion 48 with an opening 50 therein, preferably circular, and an outer portion 52 on which cutting edges 54 are provided.

As shown in FIG. 1, a plurality of blade connecting means may be coaxially arranged along the shaft 10 to form a mower shaft assembly. To this end, a coil spring 64 may be used to compress the assembly of the members 20 and 22, and the tubular spacers 36, together. At one end of the assembly, a retaining member 22 abuts a portion of one bearing 12, and at the other end of the assembly, the spring 64 abuts a lug member 20 and a portion of the other bearing 12.

Upon rotation of the shaft 10, the blades 26 extend radially from the hooks 34 of the lug members 20.

Should the rotating blades strike an object, the blades 26 are free to pivot or move on the lug members 20 so as to minimize damage to the blades 26 or the lug members 20 and also to minimize the danger of "throwing" the object struck.

No tools are required either to remove or install a blade on the shaft. Thus, if it becomes necessary to remove a blade 26, such removal is easily accomplished by simply manipulating the blade to separate the free end 46 of the retaining member 22 from the hook 34 of the lug member 20. The blade 26 may then be slid through the gap between the free end 46 and hook 34. The removal may be easily accomplished by pivoting the blade about the end edge of the free end 46 to displace the free end from the hook 34. Preferably, the blade is first positioned to extend laterally of the axis of the shaft 10, as shown in dashed lines in FIGS. 2 and 4, and the blade is then pivoted about an axis extending longitudinally of the blade to a position between the free end 46 and the hook 34, as shown by the full line position of the upper blade 26 in FIG. 4. The aforementioned pivotal movement of the blade 26 forces the hook 34 and the free end 46 apart. As shown in FIG. 5, the removal is completed by sliding the blade 26 between the members 20 and 22 longitudinally of the blade.

Installation of a blade 26 is accomplished by reversing the foregoing operations, i.e., the blade 26 is inserted between the members 20 and 22 until the hook 34 overlies the opening 50 in the blade, and the blade is then pivoted onto the hook.

From the foregoing, it is apparent that a novel and useful blade connecting means is herein disclosed for securing a plurality of blades to a shaft. Such connecting means includes a lug member having a hook and a retaining member having a free end which closes the hook to retain a blade thereon. Further, removal and installation of the blades may be accomplished manually without the use of any tools.

I claim:

1. Connecting means for connecting to a mower shaft a blade having an opening therein, comprising a lug member and a resilient retaining member, said lug member having a portion thereof adapted to be secured to the mower shaft, said lug member having a hook for engaging in said opening in said blade, said retaining member being adapted to be secured to the shaft and having a free end closing the opening of said hook for retaining said blade on said hook, said free end of said retaining member being displaceable from said lug member to permit installation and removal of said blade.

2. Connecting means of claim 1, wherein said lug member has a pair of hooks extending from opposite ends thereof, and said retaining member has a pair of free ends extending from opposite ends thereof.

3. Connecting means of claim 1, wherein said retaining member and said portion of said lug member have center openings therein, said center openings being adapted to receive the mower shaft.

4. Connecting means of claim 1, further comprising a spacer adapted to be mounted on the shaft between said lug member and said retaining member.

5. Connecting means of claim 1, wherein the bend of said hook is located at the outer end of said lug member, and said free end of said retaining member extends toward said hook.

6. Connecting means of claim 5, wherein the free end of said retaining member underlies and is generally parallel to the end portion of said hook.

7. Connecting means of claim 1, wherein said blade is insertable between said hook of said lug member and said free end of said retaining member with said hook overlying said opening in said blade, said blade being pivotable onto said hook.

8. Connecting means of claim 1, having said blade mounted on said hook and said free end of said retaining member underlying and closing said hook, said blade being pivotable about the end edge of said free end to separate said free end from said hook, whereby said blade may be slid between said hook and said free end and be removed.

9. Connecting means of claim 8, in which said blade when mounted on said hook is turned to extend laterally of the axis of the shaft, said blade then being pivoted about the end edge of said free end and about an axis extending longitudinally of said blade.

10. Connecting means of claim 1, wherein a plurality of said connecting means are arranged generally co-axially with each other along said shaft, said lug member and said retaining member of each of said connecting means being axially spaced from each other.

11. Connecting means of claim 10, in which said retaining member of one of said connecting means is adjacent said lug member of the next connecting means, and a spacer is adapted to be mounted on the shaft between the members of each of said connecting means.

12. Connecting means of claim 11, wherein said hook of each connecting means extends toward said free end of said retaining member of said connecting means.

13. Connecting means for connecting a blade to a mower shaft comprising a mower shaft, a lug member, a retaining member, and a blade, said members being secured to said shaft, said lug member extending generally radially from said shaft and having a hook at its outer end, said hook being turned toward said shaft, said retaining member having a free end extending generally toward and into engagement with said hook, one of said members being resilient and disengageable from the other of said members, said blade having an opening therein and being removably secured on said hook.

14. Connecting means of claim 13, wherein said lug member has a pair of hooks, said retaining member has a pair of free ends, and a blade may be secured on each of said hooks.

* * * * *